(12) United States Patent
Lee et al.

(10) Patent No.: US 8,304,727 B2
(45) Date of Patent: Nov. 6, 2012

(54) IMAGE SENSOR CAPABLE OF JUDGING PROXIMITY TO SUBJECT

(75) Inventors: Byoung-Su Lee, Yeosu-si (KR); Young-Ho Seo, Gunpo-si (KR)

(73) Assignee: Siliconfile Technologies Inc., Seoul (KR)

( * ) Notice: Subject to any disclaimer, the term of this patent is extended or adjusted under 35 U.S.C. 154(b) by 275 days.

(21) Appl. No.: 12/697,810

(22) Filed: Feb. 1, 2010

(65) Prior Publication Data

US 2010/0200752 A1    Aug. 12, 2010

(30) Foreign Application Priority Data

Feb. 6, 2009  (KR) .................. 10-2009-0009508

(51) Int. Cl.
*H01L 31/00* (2006.01)
(52) U.S. Cl. ...................................................... 250/330
(58) Field of Classification Search .............. 250/330, 250/492.2, 559.38; 257/E31.095
See application file for complete search history.

(56) References Cited

U.S. PATENT DOCUMENTS

| 7,138,646 B2 * | 11/2006 | Hashimoto et al. ...... 250/559.38 |
| 2010/0201966 A1 * | 8/2010 | Mase et al. .................. 356/5.01 |

FOREIGN PATENT DOCUMENTS

WO    2009/005098 A1    1/2009

* cited by examiner

*Primary Examiner* — David Porta
*Assistant Examiner* — Faye Boosalis
(74) *Attorney, Agent, or Firm* — Kile Park Goekjian Reed & McManus PLLC

(57) ABSTRACT

An image sensor is capable of judging proximity to a subject. The image sensor judges the distance to the subject using a change in output voltage value by the presence or absence of a specific band of wavelengths of infrared (IR) measured by optical sensors such as proximity pixels. Thereby, the image sensor enables an ordinary image sensor to easily realize a proximity function, and makes it possible to minimize damage to a quality of image when the image is picked up in a night photography mode or in a proximity photography mode.

7 Claims, 4 Drawing Sheets

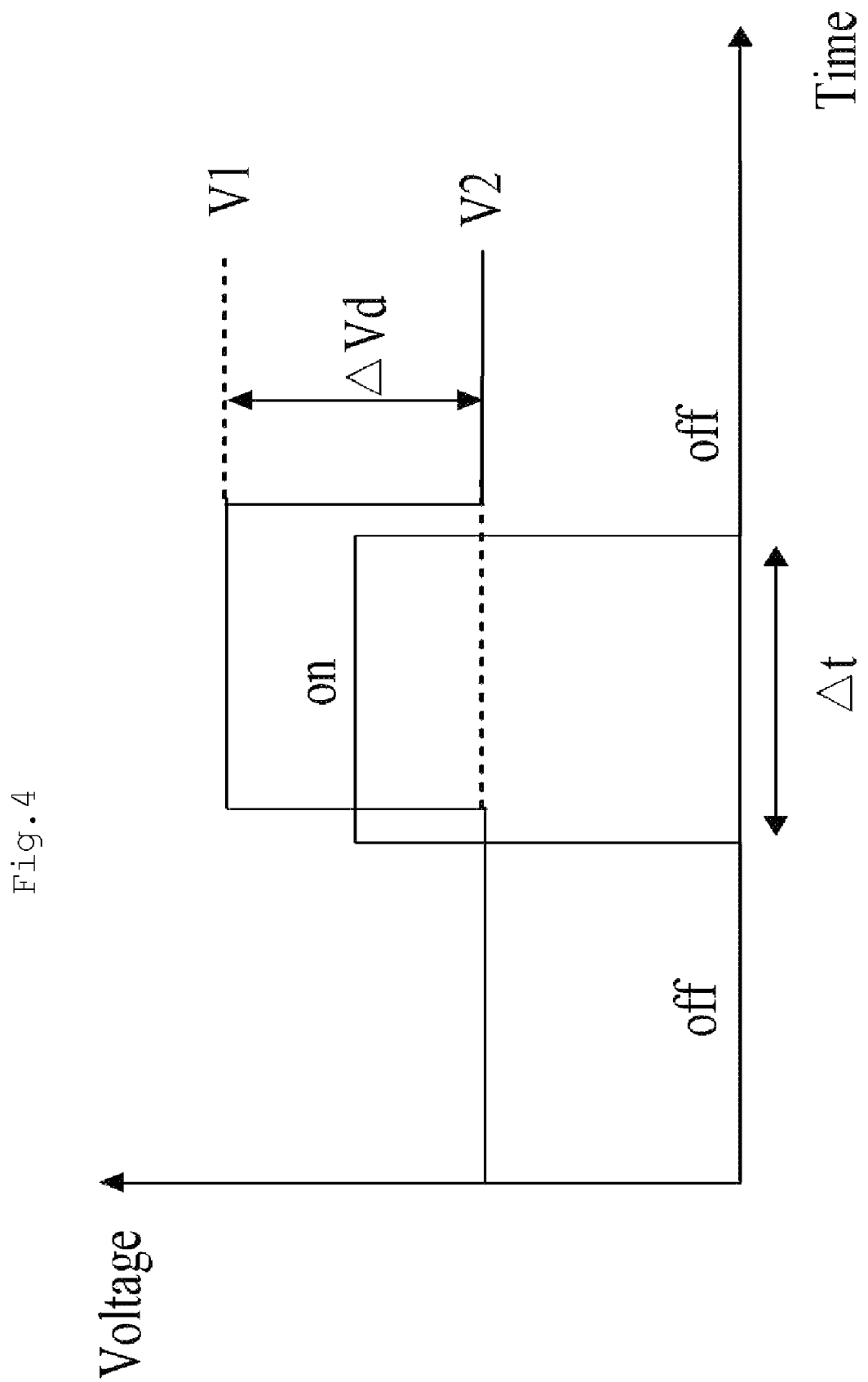

IMAGE SENSOR CAPABLE OF JUDGING PROXIMITY TO SUBJECT

BACKGROUND OF THE INVENTION

1. Field of the Invention

The present invention relates, in general, to an image sensor and, more particularly, to an image sensor capable of judging proximity to a subject, in which the distance to a subject is judged based on a change in output voltage value by the presence or absence of a specific band of wavelengths of infrared (IR) when measured by optical sensors such as proximity pixels, thereby enabling an ordinary image sensor to easily realize a proximity function, and making it possible to minimize damage to a quality of image when the image is picked up in a night photography mode or in a proximity photography mode.

2. Description of the Related Art

Generally, image sensors using a charge coupled device (CCD) or a complementary metal oxide semiconductor (CMOS) has an absorption band between 400 nm and 1100 nm. Further, the visible light usually has a wavelength ranging from 380 nm to 650 nm, and the infrared (IR) light has a wavelength ranging from 650 nm to 1100 nm. These image sensors usually employ an IR cutoff filter, which transmits light having a wavelength of 650 nm or less and cuts off light having a wavelength of 650 nm or more, i.e. an IR band of wavelengths, so as to be able to sense and display the same colors as colors which are visible to human eye.

In order to photograph a closed space, etc. using this image sensor in an environment where external light is weak, for instance at night or after a lamp is turned off, as in a surveillance camera and obtain an image, use was generally made of an IR region of light as the light of a light source. In this manner, when the IR region of light is used as the light of the light source according to an external environment, the IR region of light is cut off by the IR cutoff filter if the light from an external light source is sufficient, so that a quality of image is improved. However, when the light from the external light source is insufficient to use the IR region of light as the light of the light source, the IR region of light is allowed to reach the image sensor by removing the IR cutoff filter.

Thus, a conventional system using the image sensor should be provided with moving means capable of varying a position of the IR cutoff filter according to the external light source. In this manner, because the moving means for mechanically moving the IR cutoff filter is installed, the surveillance camera, etc. become bulky, and production cost is increased.

Further, an IR light emitting diode (LED) used in the conventional image sensor is generally limited only to a function as a light source for obtaining an image in a dark environment.

Recently, in using mobile instruments such as digital cameras or mobile phones, electronic instruments, and so on, there is increasing a demand for a proximity function in which it is determined how much a user is separated from the mobile instrument, and the mobile instrument is allowed to be automatically controlled. As such, there is a proposal to use the mobile instrument in such a manner that, in the case where a distance between the user and the mobile instrument is measured, and thus the user is determined to be adjacent to the mobile instrument on the basis of information on the distance, the mobile instrument can automatically interrupt supply of power to a back light unit (BLU) to reduce consumption of the power, or automatically stop operation of a touch sensor to prevent malfunction.

Conventionally, in order to realize this proximity function, a proximity sensor separately manufactured using an LED and a photodetector is generally installed on the mobile instrument or the electronic instrument.

However, in the case where the separate proximity sensor is installed in this way, the volume of the mobile instrument or the electronic instrument increases to go against a current technical trend toward possibility of miniaturizing products and realizing multiple functions. In addition, the production cost for installing the separate proximity sensor is increased.

SUMMARY OF THE INVENTION

Accordingly, the present invention has been made keeping in mind the above problems occurring in the related art, and embodiments of the present invention provide an image sensor capable of judging proximity to a subject, in which an infrared (IR) light emitting diode (LED), which radiates a part of IR light having a specific band of wavelengths and is used as a light source for night photography, and an IR pass filter, which is capable of transmitting visible light and the IR light having this specific band of wavelengths, are provided in a system such as a camera having an image sensor, thereby minimizing damage to a quality of image by cutting off the IR light having other band of wavelengths than the specific band of wavelengths, measuring a change in output voltage value of a sensor element caused by the IR light having the specific band of wavelengths of IR light that is radiated from the IR LED, is reflected from the subject, and is incident to the sensor element, and judging a distance to the subject on the basis of such an output voltage value change.

According to an aspect of the present invention, there is provided an image sensor capable of judging proximity to a subject. The image sensor includes: a light source radiating infrared (IR) light having a specific band of wavelengths to the subject; a light source controller having a light emitting diode (LED) controller, which generates a control signal controlling turn-on and -off of the light source, and a LED driver, which controls supply of power to the light source using the control signal; an IR pass filter disposed between a lens, which transmits incident light reflected from the subject to a sensor element, and the sensor element, which receives the transmitted light, and transmitting only a part of the IR light which has a specific band of wavelengths and visible light; the sensor element having a voltage sensing section, which receives the light passing through the IR pass filter and generates output voltage corresponding to the received light, and an image sensing section, which obtains an image entering through the IR pass filter; and a proximity judgment unit judging proximity to the subject using an output voltage difference caused by the presence or absence of the IR light, which passes through the IR pass filter with the specific band of wavelengths and is incident onto proximity pixels provided to the voltage sensing section.

According to embodiments of the present invention, the image sensor includes an IR LED, which radiates a part of IR light having a specific band of wavelengths, and an IR pass filter, which transmits the IR light having this specific band of wavelengths, and controls radiation of the IR LED, detects a change in output voltage value caused by image signals input from the subject before and after the IR light is radiated, and easily judges proximity to the subject, so that it can realize a proximity function.

BRIEF DESCRIPTION OF THE DRAWINGS

The above and other objects, features and advantages of the present invention will be more clearly understood from the following detailed description when taken in conjunction with the accompanying drawings, in which:

FIG. 4 is a graph showing judgment of proximity to a subject using a change in output voltage value of proximity pixels in accordance with an embodiment of the present invention.

DETAILED DESCRIPTION OF THE INVENTION

Figure 1:
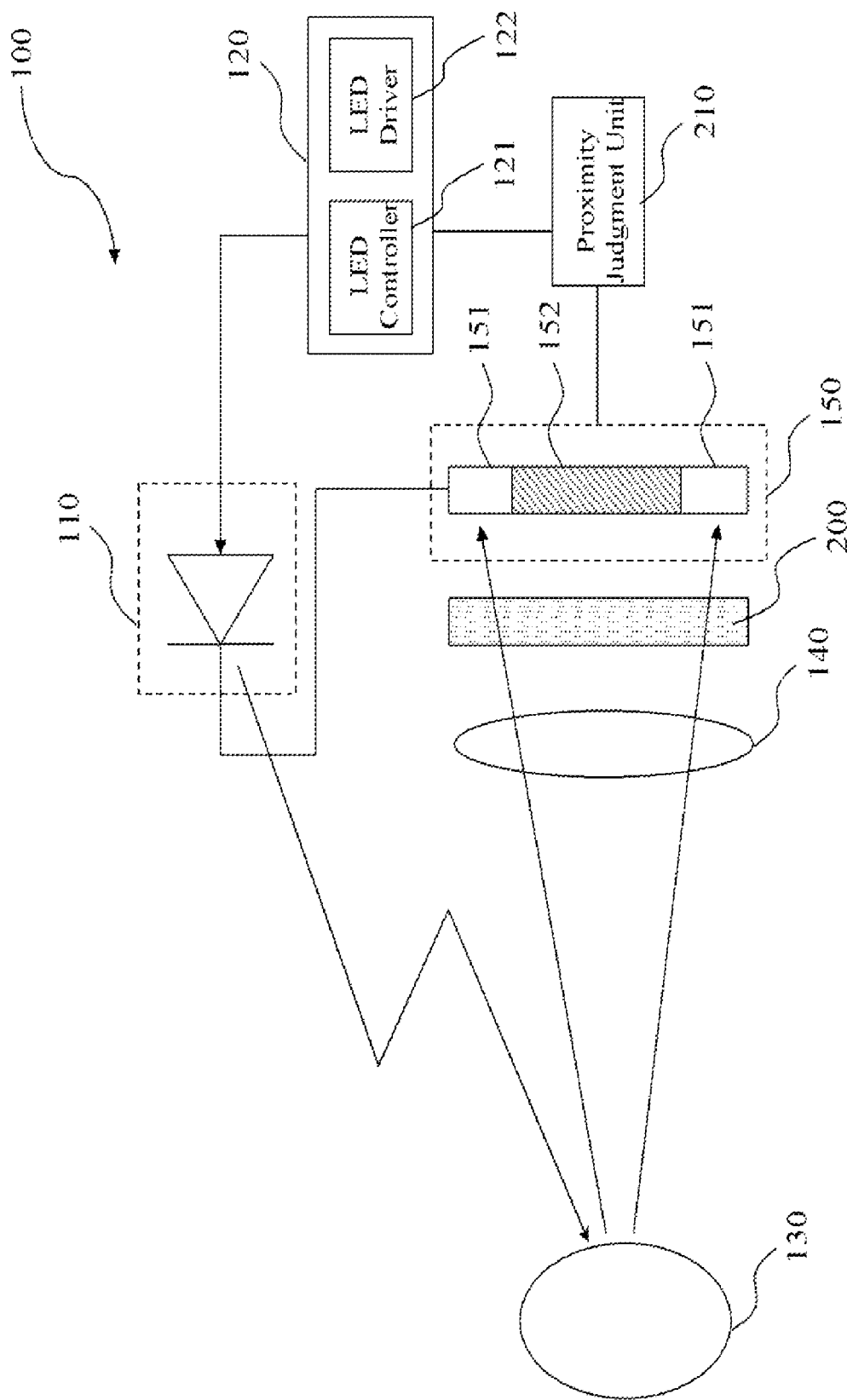
FIG. 1 shows a voltage waveform of data applied to a continuous horizontal line in the technique of inserting black data to then drive valid data.

Reference will now be made in greater detail to an exemplary embodiment of the invention, an example of which is illustrated in the accompanying drawings. Wherever possible, the same reference numerals will be used throughout the drawings and the description to refer to the same or like parts.

FIG. 1 shows configuration of a system for an image sensor capable of judging proximity to a subject according to an embodiment of the present invention.

Referring to FIG. 1, the system 100 for the image sensor capable of judging proximity to a subject according to an embodiment of the present invention includes a light source 110 radiating light to the subject 130, a light source controller 120 controlling on and off of the light source 110, a lens 140 receiving an image from the subject 130, an infrared (IR) pass filter 200 disposed between the lens 140 and a sensor element 150 and transmitting only IR light having a specific band of wavelengths and visible light, the sensor element 150 receiving the light passing through the IR pass filter 200 to obtain an image and detecting proximity to the subject 130, and a proximity judger 210 judging the proximity to the subject 130 using a difference between output voltage values of the sensor element 150 by the light radiated from the light source 110.

The light source 110 is configured as an IR light emitting diode (LED), which radiates IR light having a specific band of wavelengths to the subject under the control of the light source controller.

In this embodiment, the wavelength of the IR light radiated from the IR LED acting as the light source is illustrative of 900 nm. However, the wavelength of the IR light radiated from the IR LED is not limited to 900 nm, but it may be variously selected according to a characteristic of the IR pass filter interacting with the sensor element 150.

As in this embodiment, when the light source 110 is configured as the IR LED radiating the IR light having the wavelength of 900 nm, and is turned on in order to act as a lighting for night photography or to judge the proximity to the subject, no person feels glare, so that he/she can hardly recognize flickering of the IR LED. In contrast, the sensor element detecting light reflected from the subject 130 increases in sensitivity, so that it can obtain a more accurate image and measure the proximity with higher precision.

Further, by using the IR light of 900 nm wavelength as light of the light source, and by cutting off the IR light having any other wavelength than this wavelength at the IR pass filter 200, it is possible to minimize degradation of a color characteristic. In detail, when the IR light of 900 nm wavelength is used as the light of the light source for the night photography or the proximity judgment, the IR pass filter functions as a pass filter that transmits the IR light of 900 nm wavelength. However, in the event of daytime photography, the IR pass filter functions as an IR cutoff filter that cuts off the IR light having any other wavelength than the 900 nm wavelength, so that the IR pass filter can minimize the degradation of the color characteristic.

The light source controller 120 includes an LED controller 121 and an LED driver 122. The LED controller 121 generates a control signal controlling turn-on and -off of the IR LED on the basis of manipulation of a user or a preset manipulation mode, and sends it to the LED driver. The LED driver adjusts the supply of power to the IR LED by the control signal, and determines whether or not to radiate the light.

Thus, when the IR LED is used as the light source for the night photography, the LED controller is preferably configured to generate the turn-on signal of the IR LED by an external control signal for obtaining the image. Further, when the IR LED is used as the light source for the proximity judgment, the LED driver is preferably configured to generate a control signal for enabling the IR LED to repeat several times turn-on and -off for a predetermined time.

In this embodiment, the control signal for the proximity judgment is preferably configured so that the IR LED can repeat about three to five times the turn-on and -off while maintaining a turn-on time of the IR LED to be 0.1 sec. or less. Thereby, it is possible to more rapidly and accurately measure a difference between output voltage values of the sensor element 150, wherein the difference is caused by the presence or absence of the IR light radiated from the IR LED.

Further, in the case where the image is obtained in a night photography mode where an external light source is weak, the image of the subject 130 is obtained adopting the light radiated from the IR LED as the light of the light source.

At this time, the night photography mode may be selected when brightness of the image after the IR LED is turned off is lower than a reference value. Thus, in the case where it is determined as the night because of very low brightness of the image after the image sensor is operated, namely because of low intensity of the light incident onto luminance sensors 410a and 410b, which are closely and alternately disposed on a voltage detecting section 151 of the sensor element 150, the IR LED is turned on, and is used as the light source. In this manner, when used as the light source for the night photography, the IR LED is preferably selected to have a proper band of wavelengths, at which no person feels glare, according to a wavelength versus sensitivity curve of the image sensor.

The IR pass filter 200 is configured to be disposed between the lens, which guides incident light reflected from the subject, and the sensor element, which receives the guided light, and to have transmittance capable of transmitting only a part of the IR light which has a specific band of wavelengths and only the visible light.

Figure 2:
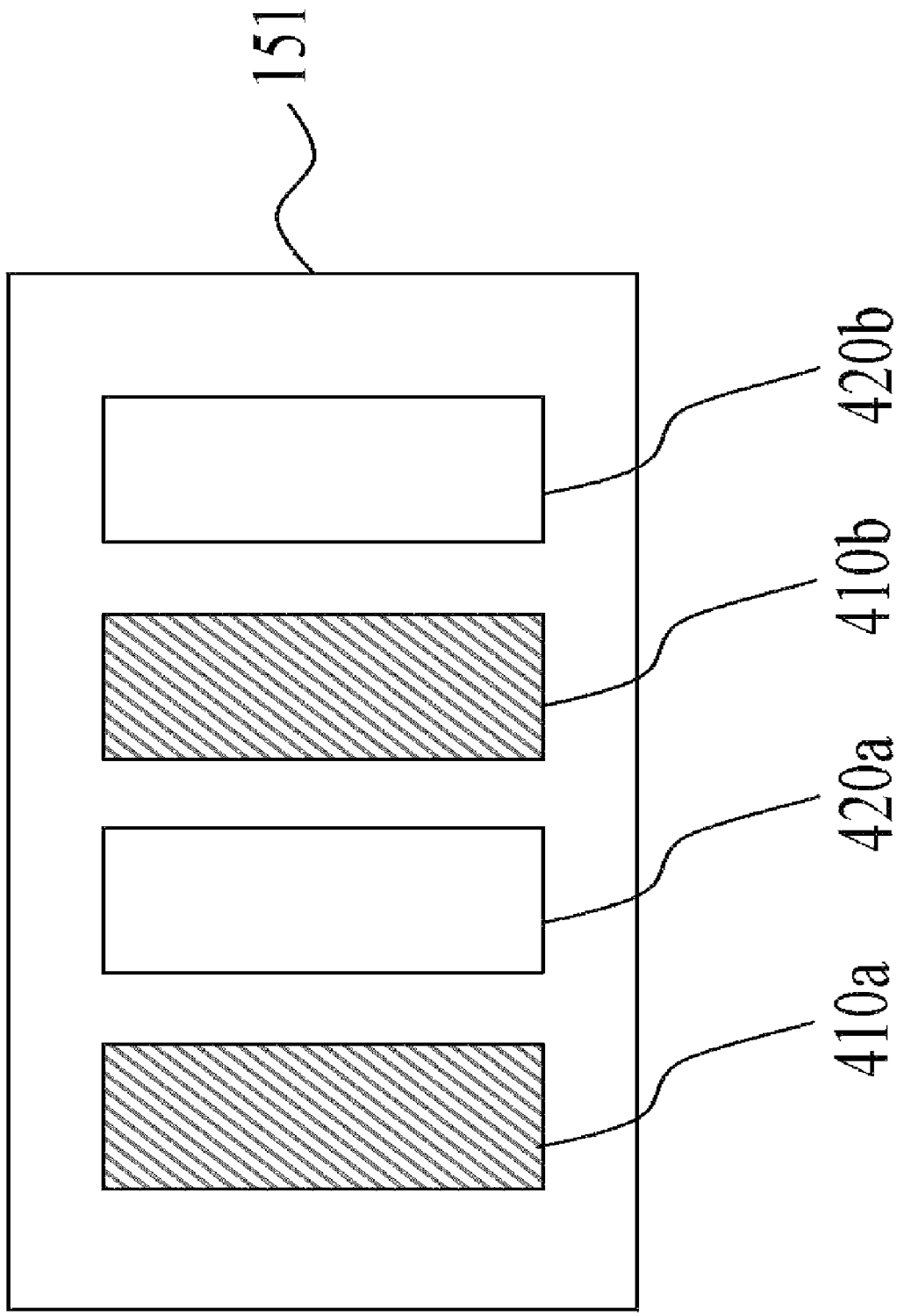
FIG. 2 is a graph showing transmittance of an IR pass filter according to an embodiment of the present invention.

FIG. 2 is a graph showing transmittance of an IR pass filter according to an embodiment of the present invention. Referring to FIG. 2, it can be seen that the IR pass filter is configured to transmit light having a visible light region, particularly a band ranging from 400 nm wavelength to 650 nm wavelength in order to obtain an image, cut off an IR region where the color characteristic is degraded, and transmit only the IR light having 900 nm wavelength, which is the light of a light source as a lighting for the proximity judgment or the night photography.

In this manner, the IR pass filter allows only a part of the IR light which has wavelengths of the IR region not continuous with respect to the wavelengths of the visible light region, so that the IR pass filter can minimize the degradation of the color characteristic, and make it possible to use the IR LED as a simple light source as well as a light source for judging the proximity to the subject.

The sensor element 150 includes a voltage sensing section 151, which receives the light passing through the IR pass filter and generates output voltage corresponding to the received light, and an image sensing section 152, which obtains an image entering through the IR pass filter.

Figure 3:
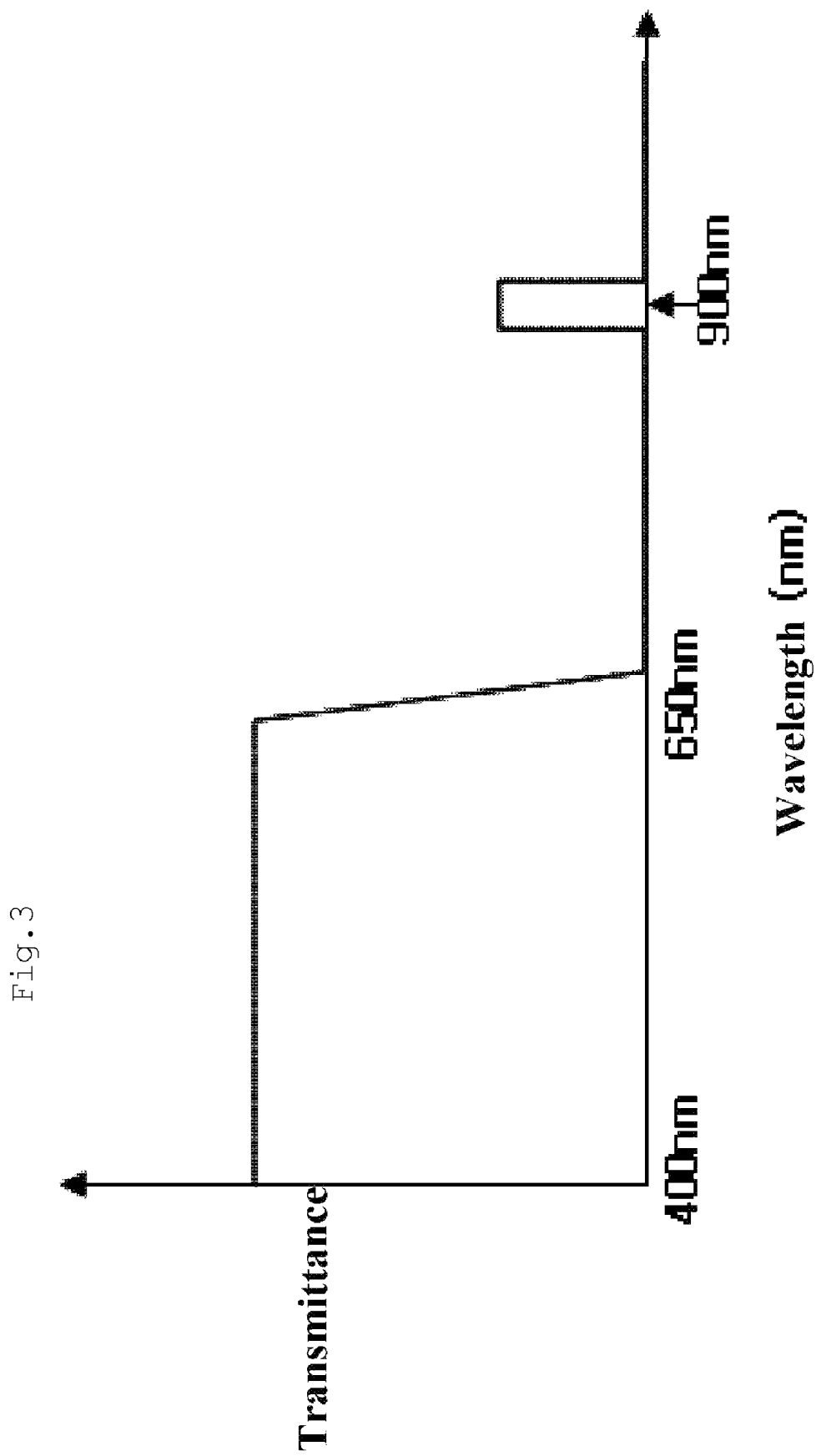
FIG. 3 shows configuration of a voltage sensing section where luminance sensors and proximity pixels are disposed in accordance with an embodiment of the present invention.

FIG. 3 shows configuration of a voltage sensing section where luminance sensors and proximity pixels are disposed in accordance with an embodiment of the present invention.

Referring to FIG. 3, the voltage sensing section 151 includes luminance sensors 410a and 410b that are alternately disposed adjacent to each other, and proximity pixels 420a and 420b that are disposed in the same fashion as the luminance sensors.

Preferably, the luminance sensors 410a and 410b are uniformly disposed throughout the sensor element so as to be able to easily measure the brightness of the light incident from the lens, and the proximity pixels 420a and 420b for judging the proximity to the subject are also disposed in the same fashion as the luminance sensors.

Here, the luminance sensors 410a and 410b are sensors that measure the brightness of the light, which is reflected from the subject, passes through the lens, and is incident onto the luminance sensor, and is usually designed to have the same spectrum as a curve of the brightness which a person feels. Further, the luminance sensors are disposed around the image sensing section 152 shown in FIG. 1, so that they can obtain an average value of intensities of the light reflected from the subject, and measure current luminance of external light from such an average value of intensities of the reflected light.

The proximity pixels 420a and 420b is configured so that an output voltage value is generated by a specific wavelength of IR light that is radiated from the IR LED, is reflected from the subject 130, and is incident onto the lens 140. Thus, it is possible to measure a change in the output voltage value caused by the incident IR light of the specific wavelength which is reflected from the subject 130 due to the proximity to the subject 130.

Here, the wavelength of the IR light radiated from the IR LED in order to judge the proximity is not limited to 900 nm. If necessary, the visible light having a band of wavelengths ranging from 610 nm to 650 nm, or the IR light having any other band of wavelengths than this band of wavelengths may be used. In this case, it is apparent that the IR pass filter should be selectively configured to have a characteristic of transmitting only the IR light having the corresponding band of wavelengths and cutting off the IR light having the other band of wavelengths.

Further, a visible light cutoff filter (not shown) is preferably provided on one side of the proximity pixels so as to cut off the visible light incident through the lens. In this manner, by providing the visible light cutoff filter on one side of the proximity pixels, it is possible to prevent the visible light from reaching the proximity pixels, and to calculate a difference between the output voltage values caused by the specific band of wavelengths of IR light reflected from the subject to thereby improve accuracy of the proximity judgment.

The proximity judgment unit 210 is configured so that one end thereof is connected to the proximity pixels of the sensor element 150 so as to judge the proximity to the subject 130 on the basis of the difference between the output voltage values caused by the specific band of wavelengths of IR light that transmits the IR pass filter and is incident onto the proximity pixels.

At this time, the proximity judgment unit 210 is configured to recognize through the control signal of the light source controller whether or not the IR light is radiated from the IR LED, and compare an output voltage value generated by the proximity pixels before the IR light having a specific band of wavelengths is radiated with that generated by the proximity pixels after the IR light having a specific band of wavelengths is radiated, thereby judging the proximity to the subject. In this case, the proximity pixels 420a and 420b, the IR LED configured as the light source, and the proximity judgment unit 210 acts as a proximity sensor.

FIG. 4 is a graph showing judgment of proximity to a subject using a change in output voltage value of proximity pixels in accordance with an embodiment of the present invention.

Referring to FIG. 4, V1 indicates the output voltage value measured by the proximity pixels onto which the light is incident through the lens when the IR LED of 900 nm wavelength is turned on, and V2 indicates the output voltage value output from the proximity pixels when the IR LED of 900 nm wavelength is turned off. Further, ΔVd indicates the difference between V1 and V2.

Intensity of the light, which is reflected from the subject when the IR LED is turned off and thus is incident onto the proximity pixels, is determined only by intensity of external light. However, intensity of the light, which is reflected from the subject when the IR LED is turned on and thus is incident onto the proximity pixels, is determined by the sum of intensity of external light and that of the light radiated from the IR LED.

Thus, a difference between the output voltage value, V2, of the proximity pixels in the state where the IR LED is turned off and the output voltage value, V1, of the proximity pixels in the state where the IR LED is turned on is determined only by relationship between the light radiated from the IR LED and the subject regardless of the external light. Further, the value, ΔVd, is dependent upon a distance between the subject and the IR LED as the light source of the light radiated to the subject.

In detail, in the case where the IR LED is very far away from the same subject, a quantity of the light, which is radiated from the IR LED, is reflected from the subject, and is incident onto the proximity pixels, is very small. However, as the IR LED is gradually moving toward the subject, the quantity of the light, which is radiated from the IR LED, is reflected from the subject, and is incident onto the proximity pixels, increases, and thus the value, ΔVd, increases.

Accordingly, when the value, ΔVd, is large, the IR light radiated from the IR LED is much reflected from the subject, and is incident onto the proximity pixels, so that the proximity judgment unit recognizes that the subject is proximate to the IR LED. In contrast, when the value, ΔVd, is small, the IR light radiated from the IR LED is less reflected from the subject, and is incident onto the proximity pixels, so that the proximity judgment unit recognizes that the subject is far away from the IR LED.

More specifically, the value, ΔVd, is in proportion to reflectance R of the subject, and is in inverse proportion to a square of the distance d between the proximity pixels and the subject. As such, when the distance d is very great (long distance), the output voltage value of the proximity pixels hardly shows a difference between the case of turning on the IR LED and the case of turning off the IR LED. In contrast, when the distance d is very small (short distance), the output voltage value of the proximity pixels shows a great difference between the case of turning on the IR LED and the case of turning off the IR LED. By finding this difference, ΔVd, of between the output voltage values, the distance d between the proximity pixels and the subject can be accurately calculated.

Further, in terms of realization, preferably, a turn-on time interval, Δt, of the IR LED is repeatedly measured three to five times for 0.1 sec. or less in order to more accurately calculate the distance d between the proximity pixels and the subject.

As described above, with the use of the IR LED radiating the IR light having a specific band of wavelengths, particularly a wavelength of 900 nm, and the IR pass filter transmitting a specific band of wavelengths of light that is radiated from this light source, is reflected from the subject, and is incident onto the lens, a change in the output voltage value of the proximity pixels caused by the presence or absence of the specific band of wavelengths of light is calculated, so that the proximity to the subject can be easily judged.

Further, by using the specific band of wavelengths of light radiated from the IR LED as an IR band of wavelengths of light that does not give any stimulus to human eyes in the event of the night photography in the night photography mode, the same IR LED is used without separately providing the light source for the night photography in the night photography mode and the light source for the proximity judgment, so that the system for the image sensor can prevent its volume from being increased, and easily realize the proximity function.

Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. An image sensor capable of judging proximity to a subject, comprising:
   a light source radiating infrared (IR) light having a specific band of wavelengths to the subject;
   a light source controller having a light emitting diode (LED) controller, which generates a control signal controlling turn-on and -off of the light source, and a LED driver, which controls supply of power to the light source using the control signal;
   an IR pass filter disposed between a lens, which transmits incident light reflected from the subject to a sensor element, and the sensor element, which receives the transmitted light, and transmitting only a part of the IR light which has a specific band of wavelengths and visible light;
   the sensor element having a voltage sensing section, which receives the light passing through the IR pass filter and generates output voltage corresponding to the received light, and an image sensing section, which obtains an image entering through the IR pass filter; and
   a proximity judgment unit judging proximity to the subject using an output voltage difference caused by whether or not the IR light, which passes through the IR pass filter with the specific band of wavelengths and is incident onto proximity pixels provided to the voltage sensing section, exists,
   wherein the voltage sensing section includes luminance sensors that are alternately disposed adjacent to each other, and proximity pixels that are alternately disposed adjacent to each other.

2. The image sensor as set forth in claim 1, wherein the voltage sensing section is configured so that the luminance sensors measuring luminance caused by external light and the proximity pixels generating output voltage attributable to the IR light passing through the IR pass filter with the specific band of wavelengths are uniformly disposed around the periphery of the image sensing section.

3. The image sensor as set forth in claim 2, wherein the voltage sensing section further includes a visible light cutoff filter installed on one side of the proximity pixels.

4. The image sensor as set forth in claim 3, wherein the proximity judgment unit is configured to compare an output voltage value of the proximity pixels when the light source is turned off with an output voltage value of the proximity pixels when the light source is turned on, and recognize that the subject is proximate to the light source when a difference between the output voltage values is great.

5. The image sensor as set forth in claim 4, wherein the light source includes an IR LED radiating the IR light having a wavelength of 900 nm, and the IR pass filter is configured as a filter having a characteristic of transmitting the IR light having 900 nm wavelength.

6. The image sensor as set forth in claim 5, wherein the light source controller controls the IR LED to repeat multiple times turn-on and -off for a predetermined time when the IR LED is used as a light source for proximity judgment.

7. The image sensor as set forth in claim 5, wherein the light source controller controls the IR LED to repeat about three to five times the turn-on and -off while maintaining a turn-on time of the IR LED to be 0.1 sec. or less.

* * * * *